Patented Jan. 7, 1930

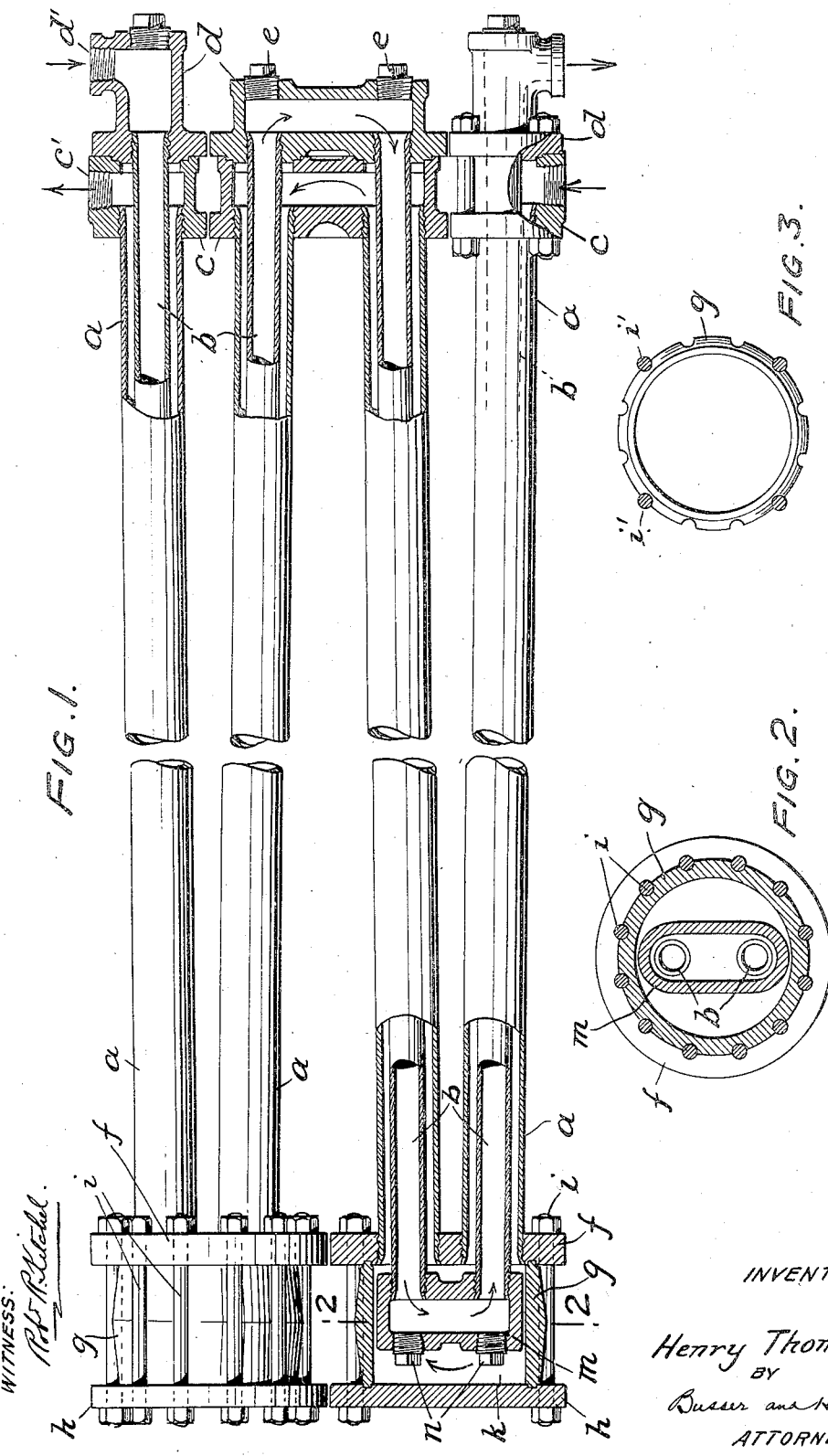

1,742,833

UNITED STATES PATENT OFFICE

HENRY THOMAS, OF RIDLEY PARK, PENNSYLVANIA, ASSIGNOR TO SUN OIL COMPANY, OF PHILADELPHIA, PENNSYLVANIA, A CORPORATION OF NEW JERSEY

HEAT EXCHANGER

Application filed January 13, 1926. Serial No. 80,934.

The object of my invention is to provide an apparatus for exchanging heat between fluids (whether the fluids be vapor or liquid), particularly where one or both of the fluids is or are at high temperatures and pressures. It is well known to effect heat exchange between fluids within tubes arranged one within another. In such an apparatus it is customary to provide a packed joint or gland through which the inner tube can slide and thus allow for expansion. In coolers or heaters where the temperatures are comparatively low and especially where the pressures are not very high, the common construction is fairly satisfactory, leakage being substantially avoided, although, in many cases, limited leakage would not be a serious matter. With higher temperatures and pressures, however, the usual provisions become less satisfactory, and with very high pressures and temperatures, the maintenance of tight joints presents a very difficult problem, and leakage becomes not only serious but highly dangerous. Where the heat exchanger is used with oil, under high temperature and pressure conditions, any leakage will result in vaporization and ignition of the oil. It is, therefore, not merely desirable, but imperative, to absolutely insure against leakage under conditions of high pressure and temperature. Under these conditions, however, it is impossible to make a gland so tight that it will not leak, to some extent, when temperature changes take place in the apparatus. Usually the leakage is quite great. The attempt to make the described type of joint absolutely tight usually results in preventing the expansion of one tube within the other, which the joint is supposed to allow. Without such freedom for expansion, a dangerous strain is imposed on the apparatus and, after all, leakage is not prevented.

In some exchangers, the packed joint or gland is used at only one end of the apparatus, so that the two tubes are fixed at one end of the apparatus and the inner tube is allowed to expand through the stuffing box or gland at the other end. While this reduces, by half, the number of sliding joints, it obviously makes no approach toward the solution of the problem of making the joints tight while allowing freedom for expansion.

The object of my invention is to provide a heat exchanger wherein the joints at all parts of the apparatus will be absolutely tight while the tubes will be free to expand, and which is adapted for use under conditions of high temperature and pressure. It is especially adapted for use in transferring heat from oil or oil vapors at very high temperatures and at comparatively or very high pressures; say, for example, from oil at a temperature of from 400° to 900° F. and at a pressure of from one hundred to one thousand pounds to the square inch to another oil at a lower temperature and under a pressure of from five hundred to one thousand pounds to the square inch.

A preferred embodiment of the invention is shown in the drawings, in which—

Fig. 1 is a side view, partly in section, of part of a double tube exchanger.

Fig. 2 is a section on the line 2—2 of Fig. 1.

Fig. 3 is an end view of one end head with the cover plate removed, certain bolts being shown in cross-section.

The right-hand end of the exchanger is of conventional form and no difficulty is presented in making the joints tight because no provisions are made for expansion, all the expansion taking place at the left-hand end. It will first be briefly described.

The end head construction at the right comprises a member $c$ into which one, or two, outer tubes $a$ are rolled, and a member $d$ into which one or two inner tubes $b$ are rolled. Where the end head carries a single pair of tubes, the two members are provided with threaded openings $c'$ and $d'$ for attachment to inlet and outlet tubes respectively. Where the end head carries two pairs of tubes, member $d$ is orificed in alignment with and opposite the ends of inner tubes $b$, for cleaning-out purposes, and the orifices closed by means of plugs $e$.

At the other or left-hand end, each end head structure comprises a fixed head carrying a pair of outer tubes and a floating head (within the fixed head) carrying a pair of inner tubes.

Each fixed head comprises a plate $f$ into orifices in which the ends of two outer tubes $a$ are rolled, an annular body $g$ and a cover plate $h$, the body $g$ being confined between the cover plate $h$ and the tube-carrying plate $f$ by means of bolts $i$, which may be of any number, twelve being shown. The elements of the fixed head form a chamber $k$ communicating with the outer tubes and accommodating the floating end head or return bend $m$. The latter is hollow and is provided in one wall with orifices into which the ends of two inner tubes $b$ are rolled. In the other face, the head $m$ is provided with orifices opposite the inner tubes and closed by plugs $n$.

In assembling the elements of the exchanger at the left-hand end, the outer tubes are first rolled in to the plate $f$. The inner tubes are then placed inside the outer tube and are rolled into the return bend $m$. The plugs $n$ and body $g$ are then applied, and the cover plate $h$ is then bolted in place. Four of the twelve bolts $i$ may be welded to the body or ring $g$, as indicated at $i'$, Fig. 3, so that the ring will be held in place when the outer cover is removed, although it can be taken off entirely when desired.

It will be observed that in my invention, the tubes have absolute freedom of expansion, thus reducing the strain on the apparatus, and packed joints, such as stuffing boxes, glands, etc. are eliminated, which permits joints to be made tight under any temperatures and pressures.

When it is desired to clean the tubes, the cover plate $h$ and plugs $n$ are readily removable. If, at any time, it is desired to renew the tubes, the body or ring $g$ may also be removed, and the old tubes may be cut out between the return bend $m$ and the fixed head. Replacement by new tubes is also facilitated. Inspection of the joints may be readily made.

The construction shown gives additional working surface between the parts carrying the two media between which heat is to be exchanged. That is, the ends of the inner tubes, carrying one fluid, and the return bends into which the ends of the inner tubes are rolled, are surrounded by a chamber carrying the other fluid. Where a stuffing box is used, the inner tube extends out through the head that carries the outer tube, so that a part of the inner tube and all of the return bend are on the outside, in which exposed part there is no heat exchange.

Having now fully described my invention, what I claim and desire to protect by Letters Patent is:

1. A heat exchanger comprising a set of at least four inner tubes and a set of at least four outer tubes surrounding the inner tubes respectively, couplings at each end so connecting tubes of the same set one to another as to form back and forth inner and outer serial passages, each coupling at one end of the structure for two adjacent inner tubes lying within and being free to move in a chamber in one of the couplings connecting the outer tubes surrounding said inner tubes, removable closures on the said outer and inner couplings to permit cleaning the inner tubes without removing the tubes or couplings, couplings at the other end of the structure having inner, outer and intermediate walls forming inner and outer chambers therein, the end outer tubes being connected to the inner walls of their couplings, while the inner tubes therein are connected to the intermediate walls of said couplings, intermediate outer tubes being connected to the inner wall of an intermediate coupling, while the tubes within said last mentioned outer tubes are connected to the intermediate wall of the last mentioned coupling whereby two separate serial passages are formed through the couplings and the inner and outer tubes, and removable plugs in the outer walls of each of the couplings at the last mentioned end of the structure in line with the inner tubes to permit cleaning the inner tubes.

2. A heat exchanger comprising pairs of tubes each pair comprising an outer tube and an inner tube, coupling devices at one end so connecting adjacent pairs of tubes as to form back and forth inner and outer serial passages; each of said coupling devices comprising an orificed plate to which the two outer tubes of two adjacent pairs of tubes are connected, a cover plate, an annular body between said plates, opposite circumferential edges of said annular body being seated in annular grooves in said plates respectively, and a hollow floating head, to which the two inner tubes of the same two pairs of tubes are connected, positioned in the chamber formed by said plates and annular body.

3. A heat exchanger comprising pairs of tubes each pair comprising an outer tube and an inner tube, coupling devices at one end so connecting adjacent pairs of tubes as to form back and forth inner and outer serial passages; each of said coupling devices comprising an orificed plate to which the two outer tubes of two adjacent pairs of tubes are connected, a cover plate, an annular body between said plates, said annular body having in its outer face grooves extending in the direction of the axis of the annular body, a hollow floating head, to which the two inner tubes of the same two pairs of tubes are connected, positioned in the chamber formed by said plates and annular body, and bolts connecting said plates and engaging the grooves in the outer face of said annular body.

4. A heat exchanger comprising pairs of tubes each pair comprising an outer tube and an inner tube, coupling devices at one end so connecting adjacent pairs of tubes as to form back and forth inner and outer serial passages; each of said coupling devices comprising an orificed plate to which the two outer tubes of two adjacent pairs of tubes are connected, a cover plate, an annular body between said plates, a hollow floating head, to which the two inner tubes of the same two pairs of tubes are connected, positioned in the chamber formed by said plates and annular body, and bolts connecting said plates and extending outside said annular body and welded thereto.

In testimony of which invention, I have hereunto set my hand at Philadelphia, Pennsylvania on this 12th day of January, 1926.

HENRY THOMAS.